United States Patent
Sakai (10) Patent No.: US 9,201,225 B2
(45) Date of Patent: Dec. 1, 2015

(54) ZOOM LENS AND IMAGE PICKUP APPARATUS INCLUDING THE SAME

(71) Applicant: CANON KABUSHIKI KAISHA, Tokyo (JP)

(72) Inventor: Hideki Sakai, Sakura (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 40 days.

(21) Appl. No.: 14/147,653

(22) Filed: Jan. 6, 2014

(65) Prior Publication Data

US 2014/0204264 A1 Jul. 24, 2014

(30) Foreign Application Priority Data

Jan. 22, 2013 (JP) ................... 2013-009114

(51) Int. Cl.
*G02B 15/14* (2006.01)
*G02B 15/177* (2006.01)

(52) U.S. Cl.
CPC .................... *G02B 15/177* (2013.01)

(58) Field of Classification Search
CPC .... G02B 15/177; G02B 15/161; G02B 15/14; G02B 15/173; G02B 7/10
USPC ................................. 359/676, 691
See application file for complete search history.

(56) References Cited

U.S. PATENT DOCUMENTS

| | | | | |
|---|---|---|---|---|
| 5,652,678 A | * | 7/1997 | Suzuki et al. | 359/557 |
| 7,362,509 B2 | * | 4/2008 | Takeuchi | 359/679 |
| 2003/0179465 A1 | * | 9/2003 | Noda | 359/691 |
| 2004/0174613 A1 | * | 9/2004 | Noda | 359/691 |
| 2009/0185283 A1 | * | 7/2009 | Maetaki | 359/689 |

FOREIGN PATENT DOCUMENTS

| | | |
|---|---|---|
| JP | 2001-141997 A | 5/2001 |
| JP | 2008-065051 A | 3/2008 |

* cited by examiner

*Primary Examiner* — James Greece
(74) *Attorney, Agent, or Firm* — Carter, DeLuca, Farrell & Schmidt, LLP

(57) ABSTRACT

A zoom lens includes, in order from an object side to an image side: a positive first lens unit; a positive second lens unit; and an aperture stop disposed between the first and second lens units and moving along a locus different from loci of the first and the second lens units during zooming, the first and second lens units being configured to change an interval therebetween during zooming, the second lens unit including at least one positive lens and at least one negative lens. A distance from a lens surface closest to the object side in the entire system to the aperture stop at a wide angle end, and a distance from the lens surface closest to the object side in the entire system to a lens surface closest to the object side in the second lens unit at the wide angle end are each appropriately set.

10 Claims, 7 Drawing Sheets

ZOOM LENS AND IMAGE PICKUP APPARATUS INCLUDING THE SAME

BACKGROUND OF THE INVENTION

1. Field of the Invention

The present invention relates to a zoom lens, which is suitable for an image pickup apparatus such as a digital still camera, a video camera, a TV camera, or a monitoring camera.

2. Description of the Related Art

In recent years, an image pickup apparatus (camera) such as a video camera or a digital still camera using a solid-state image pickup element has a smaller size and more sophisticated functions. Further, along with the smaller size and more sophisticated functions of the image pickup apparatus, an imaging optical system used for the image pickup apparatus is required to be a small zoom lens having a wide angle of field (photographing angle of field), a large aperture ratio, and high optical performance. As a zoom lens having a small entire system, a wide angle of field, and a large aperture ratio, there is known a negative lead type zoom lens in which a lens unit having a negative refractive power is positioned in front (disposed closest to an object side).

Japanese Patent Application Laid-Open No. 2001-141997 discloses a three-unit zoom lens including, in order from the object side to an image side, a first lens unit having a negative refractive power, a second lens unit having a positive refractive power, and a third lens unit having a positive refractive power, in which an interval between the lens units is changed for zooming. Japanese Patent Application Laid-Open No. 2001-141997 discloses a zoom lens having a relatively small size and a larger aperture ratio as an F-number of approximately 2.3 at a wide angle end compared with an F-number of approximately 2.8 that is common in conventional systems. In addition, Japanese Patent Application Laid-Open No. 2008-065051 discloses a two-unit zoom lens including, in order from the object side to the image side, a first lens unit having a negative refractive power, and a second lens unit having a positive refractive power, in which an interval between the lens units is changed for zooming. Japanese Patent Application Laid-Open No. 2008-065051 discloses a zoom lens that has achieved a large aperture ratio as an F-number of approximately 1.4 at the wide angle end.

In recent years, the zoom lens that is used for the image pickup apparatus is strongly required to have a large aperture ratio and high optical performance over the entire zoom range.

The negative lead type zoom lens described above can relatively easily achieve a wider angle of field and a smaller size of the entire system. However, because the entire lens system becomes asymmetric with respect to the aperture stop, variations of aberrations due to zooming become larger when the aperture ratio is increased, and hence it is difficult to obtain high optical performance over the entire zoom range. In order to achieve a smaller size of the entire system and a larger aperture ratio in the negative lead type two-unit zoom lens or three-unit zoom lens described above, it is important to appropriately set a lens structure of each lens unit constructing the zoom lens and a position of the aperture stop disposed in an optical path.

For instance, it is important to appropriately set the lens structure of the second lens unit and move the aperture stop for zooming. When these structures are inappropriate, it becomes very difficult to obtain high optical performance while achieving downsizing of the entire system and a larger aperture ratio.

The three-unit zoom lens disclosed in Japanese Patent Application Laid-Open No. 2001-141997 has an F-number of approximately 2.3 at the wide angle end, which is not sufficient as a larger aperture ratio. On the other hand, the two-unit zoom lens disclosed in Japanese Patent Application Laid-Open No. 2008-065051 has a large aperture ratio as an F-number of approximately 1.4 at the wide angle end, but downsizing thereof is not sufficient because the first lens unit includes four lenses.

SUMMARY OF THE INVENTION

Therefore, the present invention provides a zoom lens having a small size of the entire lens system, a large aperture ratio, and high optical performance over the entire zoom range, and an image pickup apparatus including the zoom lens.

According to one embodiment of the present invention, there is provided a zoom lens including, in order from an object side to an image side:

a first lens unit having a negative refractive power;

a second lens unit having a positive refractive power; and an aperture stop that moves along a locus different from loci of the first lens unit and the second lens unit during zooming, which is disposed between the first lens unit and the second lens unit, the first lens unit and the second lens unit being configured to change an interval between the first lens unit and the second lens unit during zooming, the second lens unit including at least one positive lens and at least one negative lens, in which the following conditional expression is satisfied:

$$0.40 < Dsw/D2w < 0.60$$

where Dsw represents a distance from a lens surface closest to the object side in an entire system at a wide angle end to the aperture stop, and D2w represents a distance from the lens surface closest to the object side in the entire system at the wide angle end to a lens surface closest to the object side in the second lens unit.

Further features of the present invention will become apparent from the following description of exemplary embodiments with reference to the attached drawings.

DESCRIPTION OF THE EMBODIMENTS

Hereinafter, exemplary embodiments of the present invention are described in detail with reference to the attached drawings. A zoom lens of one embodiment of the present invention includes, in order from an object side to an image side, a first lens unit having a negative refractive power, and a second lens unit having a positive refractive power, in which an interval between the lens units is changed during zooming. The zoom lens further includes, between the first lens unit and the second lens unit, an aperture stop that moves along a locus different from loci of other lens units during zooming. The zoom lens may further include, on the image side of the second lens unit, a third lens unit having a positive refractive power that moves during zooming.

Figure 1:
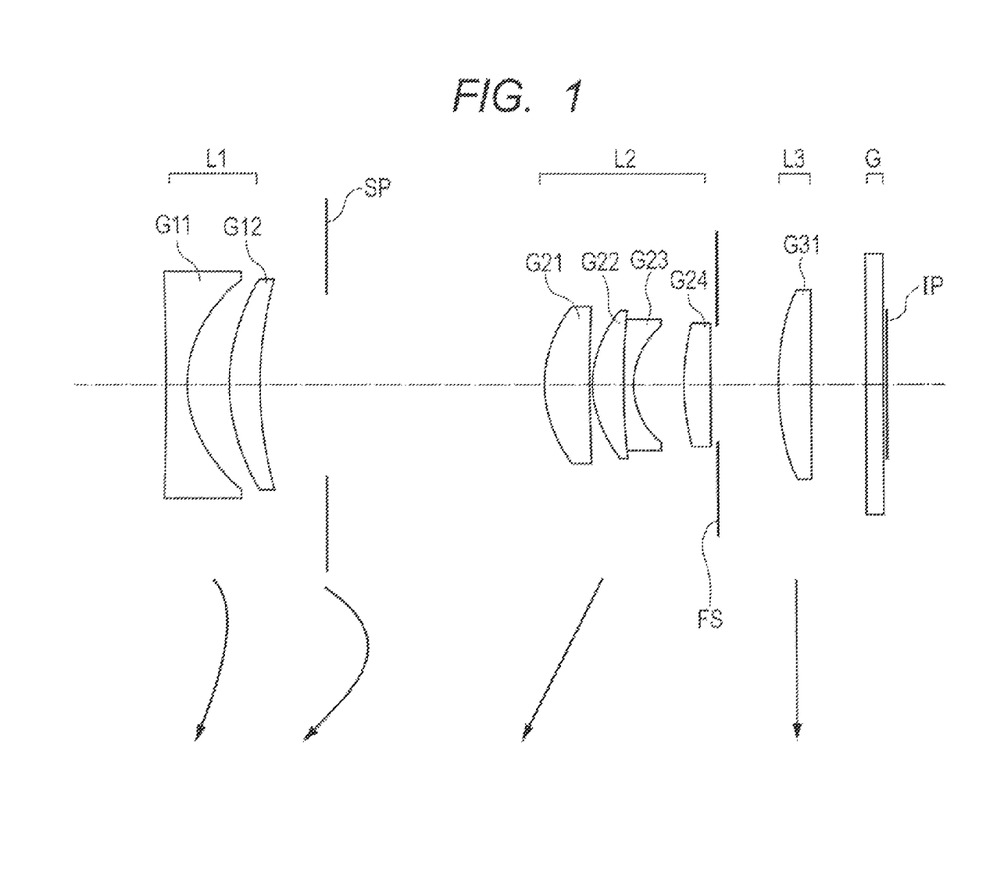
FIG. 1 is an optical cross-sectional view and movement loci of lens units in a zoom lens of Embodiment 1 of the present invention.
Figure 2A:
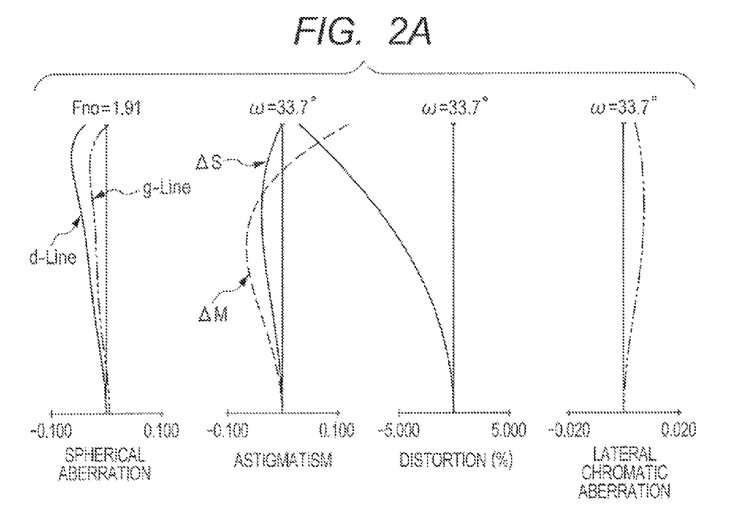
FIG. 2A is an aberration diagram at a wide angle end of the zoom lens of Embodiment 1 of the present invention.
Figure 2B:
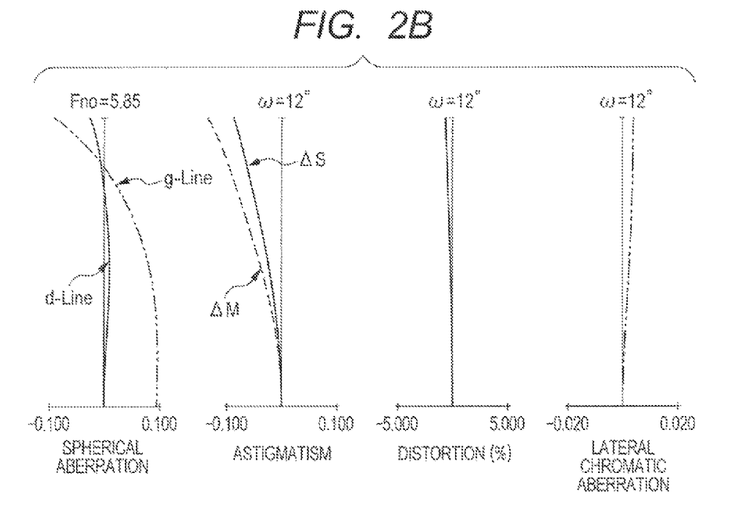
FIG. 2B is an aberration diagram at a telephoto end of the zoom lens of Embodiment 1 of the present invention.

FIG. 1 is a lens cross-sectional view at a wide angle end of a zoom lens of Embodiment 1 of the present invention. FIGS. 2A and 2B are aberration diagrams of the zoom lens of Embodiment 1 at the wide angle end and a telephoto end, respectively. The zoom lens of Embodiment 1 has a zoom ratio of 3.62, an aperture ratio of 1.91 to 5.85, and a photographing half angle of field of 33.73 degrees at the wide angle end.

Figure 3:
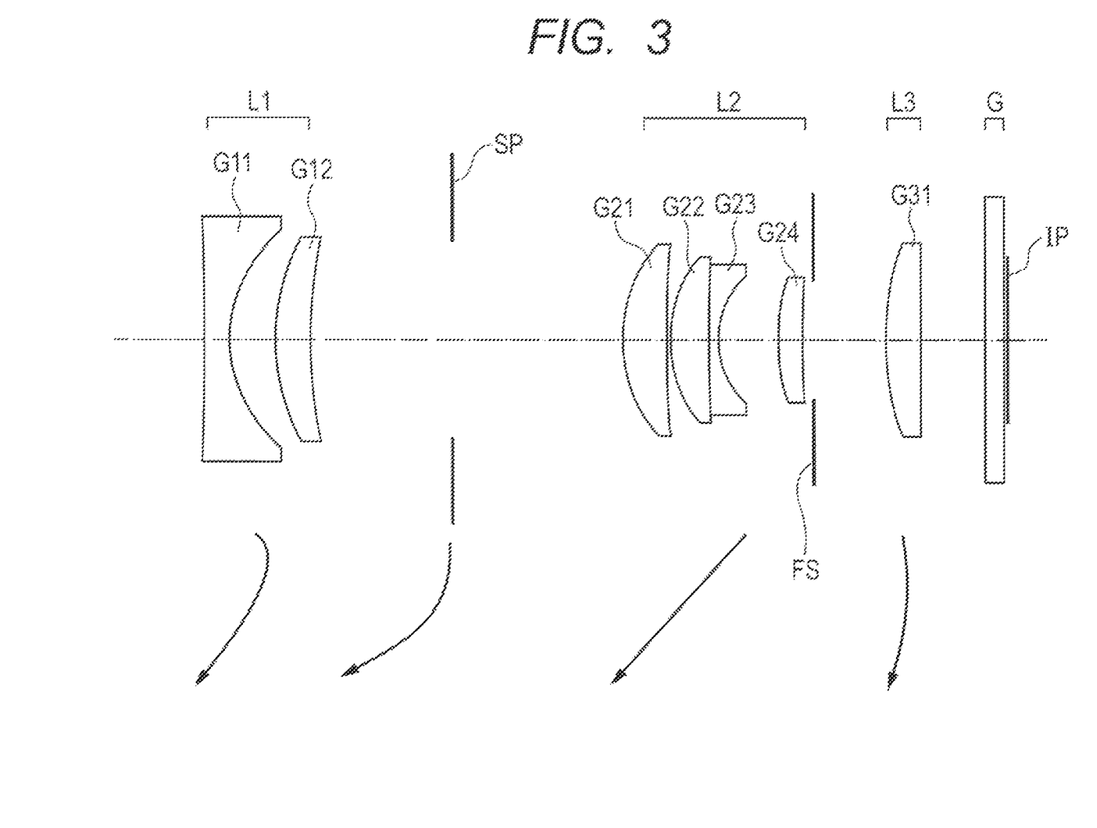
FIG. 3 is an optical cross-sectional view and movement loci of lens units in a zoom lens of Embodiment 2 of the present invention.
Figure 4A:
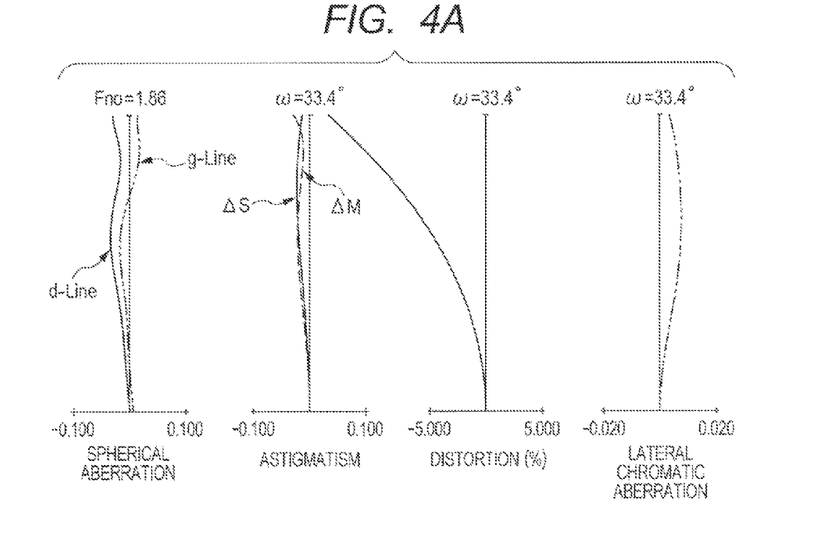
FIG. 4A is an aberration diagram at the wide angle end of the zoom lens of Embodiment 2 of the present invention.
Figure 4B:
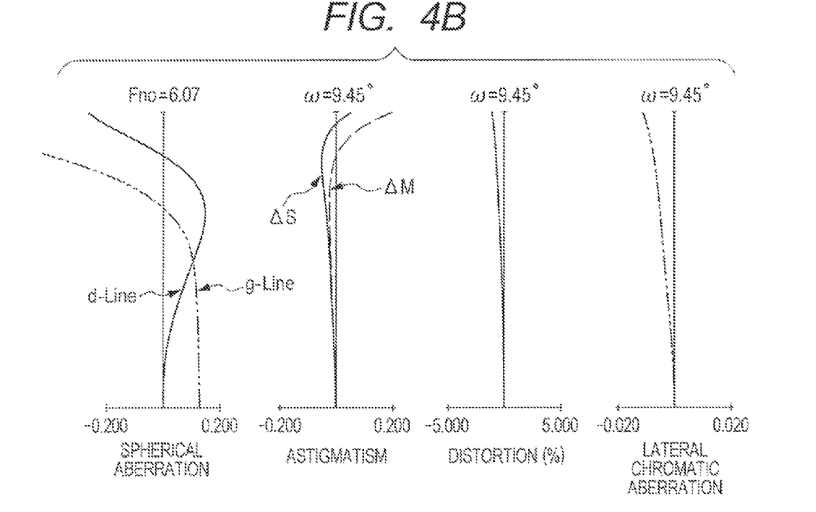
FIG. 4B is an aberration diagram at the telephoto end of the zoom lens of Embodiment 2 of the present invention.

FIG. 3 is a lens cross-sectional view at the wide angle end of a zoom lens of Embodiment 2 of the present invention. FIGS. 4A and 4B are aberration diagrams of the zoom lens of Embodiment 2 at the wide angle end and the telephoto end, respectively. The zoom lens of Embodiment 2 has a zoom ratio of 4.50, an aperture ratio of 1.86 to 6.07, and a photographing half angle of field of 33.39 degrees at the wide angle end.

Figure 5:
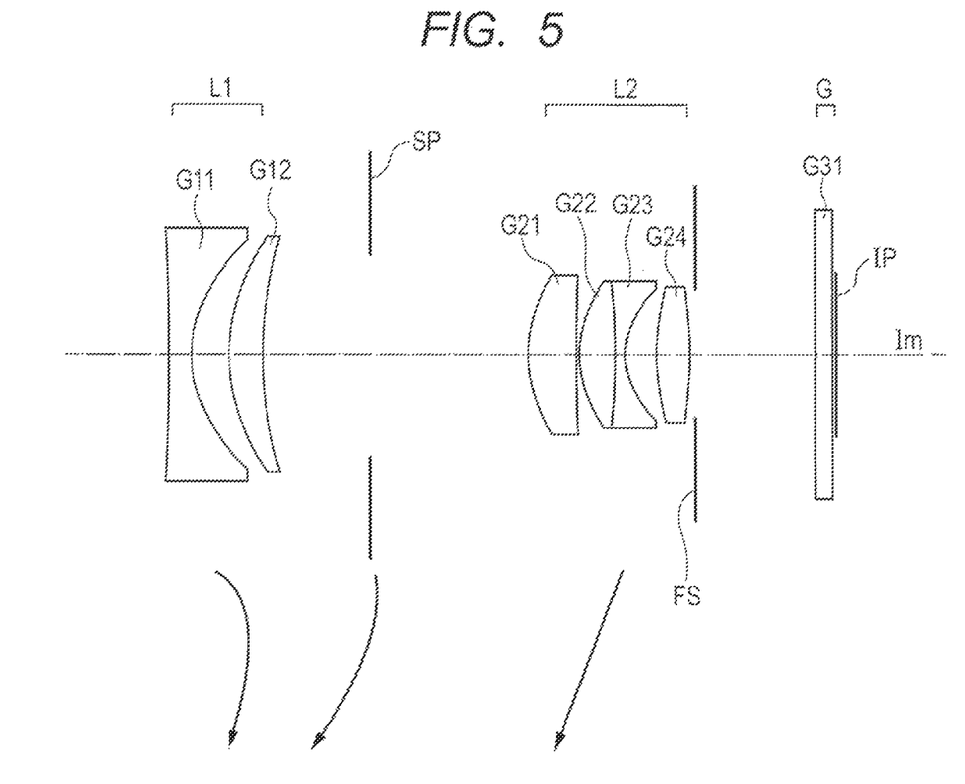
FIG. 5 is an optical cross-sectional view and movement loci of lens units in a zoom lens of Embodiment 3 of the present invention.
Figure 6A:
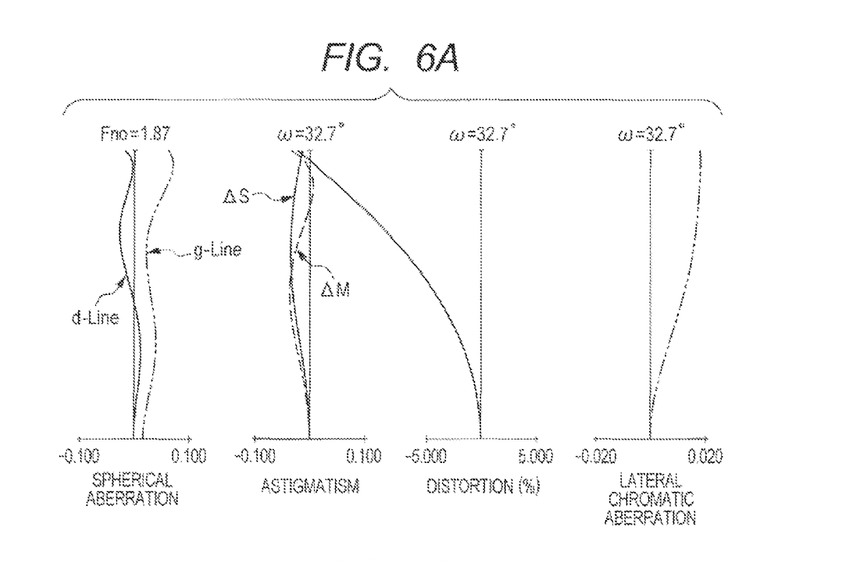
FIG. 6A is an aberration diagram at the wide angle end of the zoom lens of Embodiment 3 of the present invention.
Figure 6B:
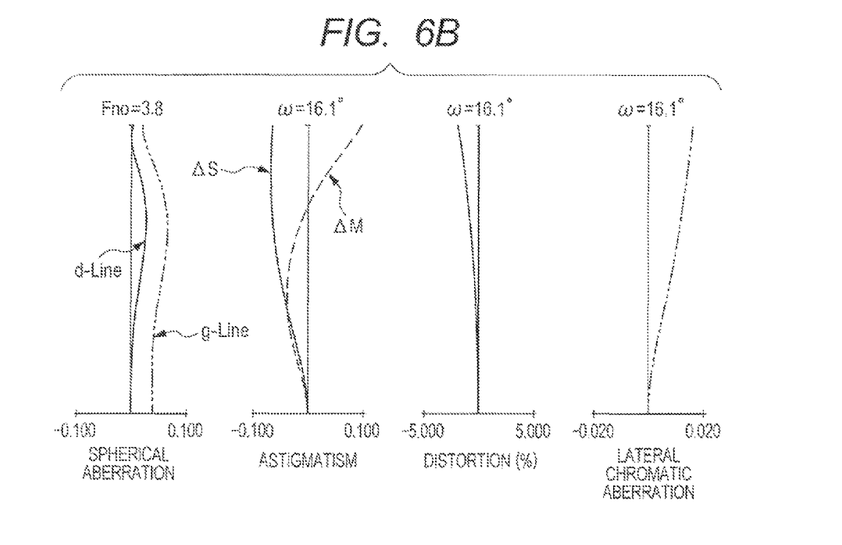
FIG. 6B is an aberration diagram at the telephoto end of the zoom lens of Embodiment 3 of the present invention.

FIG. 5 is a lens cross-sectional view at the wide angle end of a zoom lens of Embodiment 3 of the present invention. FIGS. 6A and 6B are aberration diagrams of the zoom lens of Embodiment 3 at the wide angle end and the telephoto end, respectively. The zoom lens of Embodiment 3 has a zoom ratio of 2.56, an aperture ratio of 1.87 to 3.80, and a photographing half angle of field of 32.67 degrees at the wide angle end.

Figure 7:
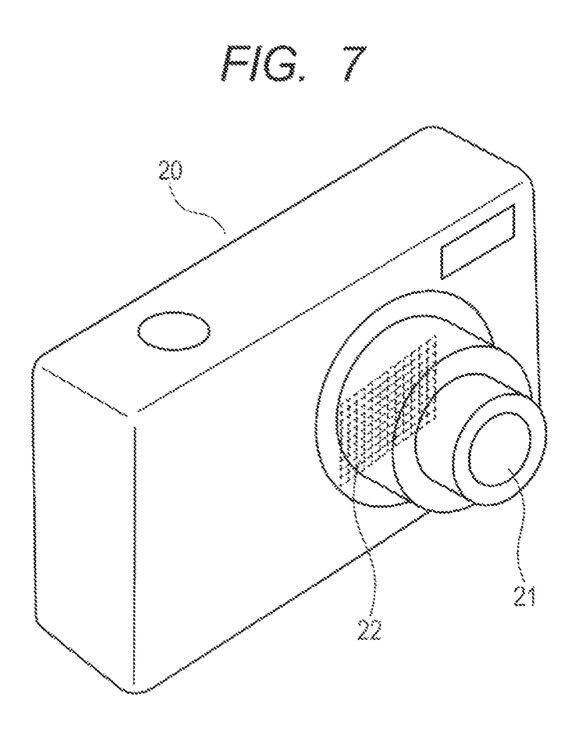
FIG. 7 is a schematic diagram of a main part of an image pickup apparatus of the present invention.

FIG. 7 is a schematic diagram of a main part of an image pickup apparatus of the present invention. The zoom lens of each embodiment is an image taking lens system used for an image pickup apparatus such as a video camera and a digital camera. In the lens cross-sectional views, a left is a subject side (an object side) (front), and a right is an image side (rear). In the lens cross-sectional views, an order of the lens unit from the object side is denoted by i, and the i-th lens unit is denoted by Li.

An aperture stop for restricting an F-number light beam is denoted by SP. A flare cut stop for restricting a passing light beam is denoted by FS. An optical block G corresponds to an optical filter, a face plate, a quartz low pass filter, or an infrared cut filter. On an image plane IP, there is set an image pickup surface of a solid-state image pickup element (photoelectric conversion element) such as a CCD sensor or a CMOS sensor in the case of use as an image taking optical system for a video camera or a digital still camera.

In the aberration diagrams, spherical aberration diagrams illustrate for d-line and g-line. Astigmatism diagrams are shown for meridional image plane denoted by $\Delta M$ and for sagittal image plane denoted by $\Delta S$. A lateral chromatic aberration is represented for g line. A half angle of field (degree) is denoted by ω and an F number is denoted by Fno. Further, in the embodiments described below, the wide angle end and the telephoto end means zoom positions at which the zoom lens unit is positioned at each end in the mechanically movable range on the optical axis.

The zoom lens of each embodiment includes, in order from the object side to the image side, a first lens unit L1 having a negative refractive power, and a second lens unit L2 having a positive refractive power. Further, an interval between the lens units is changed during zooming.

The second lens unit L2 includes at least one positive lens and at least one negative lens. The zoom lens further includes, between the first lens unit L1 and the second lens unit L2, the aperture stop SP that moves along a locus different from loci of the first lens unit L1 and the second lens unit L2 during zooming. With this structure, a larger aperture ratio can be easily achieved while maintaining good optical performance even with a small number of lenses.

In each embodiment, the following conditional expression is satisfied:

$$0.40 < Dsw/D2w < 0.60 \quad (1),$$

where Dsw represents a distance from a lens surface closest to the object side in the entire system end to the aperture stop SP at the wide angle, and D2w represents a distance from the lens surface closest to the object side in the entire system to a lens surface closest to the object side in the second lens unit L2 at the wide angle end.

The zoom lens of each embodiment includes, in order to shorten the entire lens length (distance from the first lens surface to the image plane) so that a front lens diameter is decreased, in order from the object side to the image side, the first lens unit having a negative refractive power and the second lens unit having a positive refractive power. Further, the second lens unit L2 includes at least one positive lens and at least one negative lens, and hence axial aberration and chromatic aberration due to the larger aperture ratio are appropriately corrected.

The conditional expression (1) defines a position of the aperture stop SP at the wide angle end. When a lower limit value of the conditional expression (1) is exceeded, the aperture stop SP becomes too far from the second lens unit L2 having a positive refractive power so that peripheral light intensity becomes insufficient. When an upper limit value of the conditional expression (1) is exceeded, the aperture stop SP becomes too far from the first lens unit L1 having a negative refractive power, and hence it is necessary to increase a stop diameter in order to decrease the F-number.

As a result, a lower line of an off-axial ray enters a periphery of the lens at a steep angle so that flare is increased. Therefore, in order to maintain good image quality, it is necessary to increase the number of lenses of the first lens unit L1. Thus, the lens system becomes large inappropriately.

In addition, the aperture stop SP is moved along the locus different from loci of the lens units during zooming, so as to be positioned at an appropriate position in the optical axis direction at an intermediate zoom position. Further, because the aperture stop SP can be moved so as not to interfere with the lens units on the telephoto side, the aperture stop SP does not prevent movement of the second lens unit L2 that is mainly in charge of zooming, which facilitates downsizing of the entire lens length at the same magnification. In each embodiment, it is more preferred to set the value range of the conditional expression (1) as follows.

$$0.41 < Dsw/D2w < 0.60 \quad (1a)$$

It is still more preferred to set the conditional expression (1a) as follows.

$$0.50 < Dsw/D2w < 0.60 \quad (1b)$$

In each embodiment, it is more preferred to satisfy one or more of the following conditional expressions:

$$-1.20 < f2/f1 < -0.70 \quad (2)$$

$$2.50 < Dss/fw < 4.50 \quad (3)$$

$$0.800 < \phi fw/\phi bw < 1.400 \quad (4)$$

$$0.500 < \phi Dw/fw < 1.000 \quad (5)$$

where f1 represents a focal length of the first lens unit L1 and f2 represents a focal length of the second lens unit L2. The zoom lens includes a flare cut stop FS on the image side of the second lens unit L2. Dss represents a distance from the aperture stop SP to the flare cut stop FS at the wide angle end, and fw represents a focal length of the entire system at the wide angle end. Further, φfw represents an aperture diameter of the aperture stop SP at the wide angle end, φbw represents an aperture diameter of the flare cut stop FS at the wide angle end, and φDw represents a diameter of a light beam that is emitted from a point light source positioned at infinity on the optical axis and enters the lens surface closest to the object side at the wide angle end.

Next, technical meanings of the above-mentioned conditional expressions are described below.

The conditional expression (2) defines a preferred ratio between the focal length of the first lens unit L1 and the focal length of the second lens unit L2. When the lower limit value of the conditional expression (2) is exceeded, refractive power of the second lens unit L2 becomes too small, and hence much spherical aberration or coma is generated inappropriately from the second lens unit L2. When the upper limit value of the conditional expression (2) is exceeded, an absolute value of the negative focal length of the first lens unit L1 becomes too large. Therefore, it becomes difficult to correct field curvature or the like generated in the first lens unit L1 without adding a lens, which is not good. It is more preferred to set the value range of the conditional expression (2) as follows.

$$-1.10 < f2/f1 < -0.70 \quad (2a)$$

It is still more preferred to set the conditional expression (2a) as follows.

$$-1.10 < f2/f1 < -1.00 \quad (2b)$$

The conditional expression (3) defines a preferred position of the flare cut stop FS in the optical axis direction. When the lower limit value of the conditional expression (3) is exceeded, the flare cut stop FS becomes too close to the aperture stop SP. Therefore, it becomes difficult to effectively suppress flare on an upper line of the off-axial ray that is apt to be deteriorated by a larger aperture ratio. When the upper limit value of the conditional expression (3) is exceeded, peripheral light intensity is rapidly decreased inappropriately. It is more preferred to set the value range of the conditional expression (3) as follows.

$$2.90 < Dss/fw < 4.10 \quad (3a)$$

The conditional expression (4) defines a preferred ratio between an aperture diameter of the aperture stop SP disposed between the first lens unit L1 and the second lens unit L2 at the wide angle end, and the aperture diameter of the flare cut stop FS disposed on the image side of the second lens unit L2 at the wide angle end. When the lower limit value of the conditional expression (4) is exceeded, the aperture diameter of the flare cut stop FS becomes too large so that it becomes difficult to sufficiently suppress flare on the upper line of the off-axial ray.

For this reason, it becomes difficult to correct the flare without adding a lens to the second lens unit L2 and a lens on the image side of the second lens unit L2. When the upper limit value of the conditional expression (4) is exceeded, a stop diameter of the aperture stop SP becomes too large. Therefore, it becomes difficult to sufficiently suppress the flare on the lower line. For this reason it becomes difficult to correct the flare without adding a lens to the second lens unit L2 and a lens on the object side of the second lens unit L2.

The conditional expression (5) defines a preferred diameter of an axial light beam with respect to a focal length of the entire system at the wide angle end. When the lower limit value of the conditional expression (5) is exceeded, it is advantageous for optical performance but obtained light intensity becomes small because the diameter of the axial light beam is too small. Therefore, it becomes difficult to achieve a larger aperture ratio. When the upper limit value of the conditional expression (5) is exceeded, the diameter of the axial light beam becomes too large. Therefore, it becomes difficult to obtain good imaging performance over the entire range of the light beam without increasing the number of lenses. It is more preferred to set the value ranges of the conditional expressions (4) and (5) as follows.

$$0.900 < \phi fw/\phi bw < 1.250 \quad (4a)$$

$$0.500 < \phi Dw/fw < 0.600 \quad (5a)$$

As described above, according to each embodiment, it is possible to provide a zoom lens having a small number of lenses, a small size of the entire system, and a large aperture ratio as an F-number of 2.0 or smaller that is one step smaller than a hitherto common zoom lens having an F-number of approximately 2.8 so as to sufficiently obtain the effect of the larger aperture ratio.

Next, an exemplary lens structure of each embodiment is described. It is preferred that the aperture stop SP move along a locus convex toward an image side when zooming from the wide angle end to the telephoto end. Thus, even when the F-number is changed to have a larger aperture ratio at the wide angle end, it becomes easy to effectively suppress flare on the lower line of a light ray at an intermediate image height while maintaining peripheral light intensity at an intermediate zoom position.

It is preferred to set a lens surface of the second lens unit L2 closest to the object side to be an aspherical surface. This is because, with this structure, it is possible to effectively correct spherical aberration and coma that are apt to be deteriorated by a larger aperture ratio at a relatively large height from the optical axis of the axial light beam. It is preferred to constitute the first lens unit L1 to include, in order from the object side, a negative lens and a positive lens. This is because, with this structure, lateral chromatic aberration and field curvature can be effectively corrected so that the lens structure can be simplified and downsized.

It is preferred to move the second lens unit L2 to have a component in a direction perpendicular to the optical axis so that an imaging position is moved in the direction perpendicular to the optical axis. With this structure, it becomes easy to effectively perform vibration isolation.

Next, lens structures of the embodiments are described. The zoom lenses of Embodiments 1 and 2 are three-unit zoom lenses constituted of three lens units including, in order from the object side to the image side, the first lens unit L1 having a negative refractive power, the second lens unit L2 having a positive refractive power, and the third lens unit L3 having a positive refractive power. Further, during zooming from the wide angle end to the telephoto end, as illustrated by the arrows in the lens cross-sectional views, the first lens unit L1 moves along a locus convex toward an image side, the second lens unit L2 moves toward the object side, and the third lens unit L3 moves.

The aperture stop SP moves toward the object side along a locus different from loci of other lens units. The zoom lenses of Embodiments 1 and 2 perform main zooming by moving the second lens unit L2 and correct a movement of the image plane due to zooming by moving the first lens unit L1 along a locus convex toward the image side. In addition, telecentric imaging on the image side, which is necessary for an image pickup apparatus using a solid-state image pickup element in particular, is achieved by permitting the third lens unit L3 to have a role of a field lens. In addition, the flare cut stop FS is disposed on the image side of the second lens unit L2.

The zoom lens of Embodiment 3 is a two-unit zoom lens constituted of two lens units including, in order from the object side to the image side, the first lens unit L1 having a negative refractive power, and the second lens unit L2 having a positive refractive power. Further during zooming from the wide angle end to the telephoto end, as illustrated by the arrows in the lens cross-sectional view, the first lens unit L1 moves along a locus convex toward an image side, and the second lens unit L2 moves toward the object side. The aperture stop SP moves toward the object side along a locus different from loci of the other lens units.

The zoom lens of Embodiment 3 performs main zooming by moving the second lens unit L2 and corrects movement of the image plane due to zooming by moving the first lens unit L1 along a locus convex toward the image side. In addition, the flare cut stop FS is disposed on the image side of the second lens unit L2. This flare cut stop FS cuts a harmful light ray (flare light) that deteriorates optical performance.

In each embodiment, the first lens unit L1 having a negative refractive power is constituted of two lenses including, in order from the object side to the image side, a negative lens G11 and a positive meniscus lens G12 having a convex surface on the object side. In addition, the negative lens G11 of the first lens unit has aspherical lens surfaces on both the object side and the image side. With this lens structure, lateral chromatic aberration and field curvature are appropriately corrected by a minimum number of lenses.

The second lens unit L2 includes, in order from the object side to the image side, a positive lens G21 having a convex surface on the object side, a cemented lens in which a positive lens G22 having a convex surface on the object side and a negative lens G23 having a concave surface on the image plane side are cemented, and a positive lens G24. By using a lens surface having an aspherical shape for the positive lens G21 disposed closest to the object side, spherical aberration and coma are appropriately corrected. With this lens structure, spherical aberration and coma increased by the larger aperture ratio are appropriately corrected by a small number of lenses.

In Embodiments 1 and 2, the third lens unit L3 is constituted of a single positive lens. Thus, a thin profile of the entire lens system is realized, and quick focusing is facilitated by moving the small and lightweight third lens unit in the optical axis direction. Each numerical embodiment of each embodiment described later shows a case where an object at infinity is focused. One or more aspherical lenses may be added to each lens unit in order to suppress aberration of the off-axial ray more appropriately.

The aperture area of the aperture stop SP may be variable or fixed. Even in the case where the aperture area is fixed, it is possible to obtain a desired F-number at positions other than the wide angle end by appropriately performing the movement during zooming.

Referring to FIG. 7, a digital still camera according to an embodiment of the present invention is described as an image pickup apparatus using the zoom lenses of the present invention as image taking optical systems.

In FIG. 7, the digital still camera includes: a camera main body 20; an image taking optical system 21 including any one of the zoom lenses of Embodiments 1 to 3; and a solid-state image pickup element (photoelectric conversion element) 22 such as a CCD sensor and a CMOS sensor, which is built in the camera main body to receive a subject image formed by the image taking optical system 21.

Applying the zoom lens of the present invention to a digital still camera as described above enables realization of a compact and high optical performance image pickup apparatus. Further, the zoom lens of each embodiment can be used also for a digital video camera or a projection optical system of a projection apparatus (projector).

Numerical embodiments 1 to 3 corresponding to Embodiments 1 to 3 of the present invention are described below. Each numerical embodiment shows order i of surfaces from the object side. A curvature radius of a lens surface is denoted by ri, an interval between an i-th surface and an (i+1)-th surface is denoted by di. A refractive index and an Abbe constant of an optical member interposed between the i-th surface and the (i+1)-th surface for a d-line are denoted ndi and vdi, respectively. The aspherical shape can be expressed by the following equation:

$$X=(h^2/R)/[1+\{1-(1+k)(h/R)^2\}^{1/2}]+A4h^4+A6h^6+A8h^8+A10h^{10}+A12h^{12},$$

where X represents a displacement in the optical axis direction at a position having a height h from the optical axis with respect to the vertex of surface, k represents a conic constant, A4, A6, A8, A10, and A12 represent aspherical coefficients of fourth, sixth, eighth, tenth, and twelfth orders, respectively, and R represents a paraxial curvature radius. In addition, "e-X" means "×10$^{-x}$". Further, a relationship between the above-mentioned each conditional expression and each Numerical embodiment is shown in Table 1.

A value of an interval d5 is negative at the intermediate zoom position and at the telephoto end in Numerical embodiment 3 because the aperture stop SP and the second lens unit L2 are counted in this order. Back focus BF represents an air-equivalence length from the final lens surface to a paraxial image plane. Note that, unless otherwise particularly described, the unit of the length is mm.

Numerical Embodiment 1

| Unit mm | | | | |
|---|---|---|---|---|
| Surface data | | | | |
| Surface number | r | d | nd | vd |
| 1* | −89882.247 | 1.10 | 1.84954 | 40.1 |
| 2* | 5.480 | 2.21 | | |
| 3 | 10.461 | 1.60 | 1.94595 | 18.0 |
| 4 | 21.049 | (Variable) | | |
| 5 SP | ∞ | (Variable) | | |
| 6* | 6.649 | 2.30 | 1.74330 | 49.3 |
| 7* | 195.770 | 0.17 | | |
| 8 | 5.668 | 1.65 | 1.51633 | 64.1 |
| 9 | 40.094 | 0.50 | 1.80518 | 25.4 |

-continued

Unit mm

| | | | | |
|---|---|---|---|---|
| 10 | 3.904 | 2.64 | | |
| 11 | 12.109 | 1.40 | 1.72000 | 50.2 |
| 12 | 397.545 | 0.29 | | |
| 13 FS | ∞ | (Variable) | | |
| 14 | 13.220 | 1.70 | 1.48749 | 70.2 |
| 15 | −333.999 | (Variable) | | |
| 16 | ∞ | 0.84 | 1.51633 | 64.1 |
| 17 | ∞ | 0.50 | | |
| Image plane | ∞ | | | |

Aspherical surface data

First surface

K = −7.54512e+008　　A4 = −2.24468e−004　　A6 = 6.41337e−006
A8 = −5.15297e−008　　A10 = −2.13056e−010

Second surface

K = −2.26664e+000　　A4 = 9.33605e−004　　A6 = −2.01163e−005
A8 = 9.37294e−007　　A10 = −1.63131e−008

Sixth surface

K = −1.20723e−001　　A4 = −1.07870e−004　　A6 = 1.70602e−006
A8 = 7.62863e−008　　A10 = 1.71340e−008

Seventh surface

K = 2.32795e+003　　A4 = 1.21576e−004　　A6 = 2.00095e−006
A8 = 6.73308e−007　　A10 = −1.26149e−008

Various data
Zoom ratio 3.62

| | | | |
|---|---|---|---|
| Focal length | 5.05 | 10.29 | 18.25 |
| F-number | 1.91 | 4.09 | 5.85 |
| Half angle of field (degree) | 33.73 | 20.63 | 11.99 |
| Image height | 3.37 | 3.88 | 3.88 |
| Total lens length | 38.51 | 35.93 | 42.02 |
| BF | 3.95 | 3.85 | 3.70 |
| d4 | 3.50 | 5.28 | 1.42 |
| d5 | 11.50 | 0.50 | 0.50 |
| d13 | 3.34 | 10.13 | 20.32 |
| d15 | 2.90 | 2.80 | 2.65 |

Zoom lens unit data

| Unit | First surface | Focal length |
|---|---|---|
| 1 | 1 | −10.50 |
| 2 | 6 | 10.82 |
| 3 | 14 | 26.13 |

Stop diameter data

| Surface | Diameter |
|---|---|
| 5 | 4.750 |
| 13 | 5.022 |

Numerical Embodiment 2

Unit mm

Surface data

| Surface number | r | d | nd | vd |
|---|---|---|---|---|
| 1* | −18269.953 | 1.40 | 1.84954 | 40.1 |
| 2* | 6.572 | 2.63 | | |
| 3 | 12.205 | 1.90 | 1.94595 | 18.0 |
| 4 | 23.900 | (Variable) | | |
| 5 SP | ∞ | (Variable) | | |
| 6* | 7.891 | 2.53 | 1.74330 | 49.3 |
| 7* | −7208.564 | 0.20 | | |

-continued

Unit mm

| | | | | |
|---|---|---|---|---|
| 8 | 7.614 | 2.08 | 1.51633 | 64.1 |
| 9 | 66.773 | 0.60 | 1.80518 | 25.4 |
| 10 | 4.878 | 3.34 | | |
| 11* | 13.082 | 1.37 | 1.72903 | 54.0 |
| 12* | 97.028 | 0.65 | | |
| 13 FS | ∞ | (Variable) | | |
| 14 | 15.814 | 2.00 | 1.48749 | 70.2 |
| 15 | −389.408 | (Variable) | | |
| 16 | ∞ | 1.00 | 1.51633 | 64.1 |
| 17 | ∞ | 0.50 | | |
| Image plane | ∞ | | | |

Aspherical surface data

First surface

K = −7.54512e+008　　A4 = −1.20558e−004　　A6 = 2.58721e−006
A8 = −1.74608e−008　　A10 = −3.44159e−011　　A12 = 2.21099e−013

Second surface

K = −2.20089e+000　　A4 = 5.40013e−004　　A6 = −7.50127e−006
A8 = 2.50859e−007　　A10 = −3.14999e−009　　A12 = −1.11406e−012

Seventh surface

K = −1.58177e−001　　A4 = −7.62268e−005　　A6 = 6.05648e−007
A8 = 2.00021e−008　　A10 = −2.05644e−011　　A12 = 6.78844e−011

Eighth surface

K = −8.54977e+004　　A4 = 8.43187e−005　　A6 = 1.02155e−006
A8 = 1.40331e−007　　A10 = −4.26243e−009　　A12 = 9.55445e−011

Twelfth surface

K = 1.33928e+000　　A4 = 1.25785e−004　　A6 = 2.13654e−007
A8 = −1.00957e−006　　A10 = 3.50066e−007　　A12 = −3.05955e−008

Thirteenth surface

K = −6.16286e+002　　A4 = 3.17627e−004　　A6 = 5.27720e−006
A8 = −9.40691e−007　　A10 = 1.90350e−007　　A12 = −1.75687e−008

Various data
Zoom ratio 4.50

| | Wide angle | Intermediate | Telephoto |
|---|---|---|---|
| Focal length | 6.18 | 12.53 | 27.80 |
| F-number | 1.86 | 3.71 | 6.07 |
| Half angle of field (degree) | 33.39 | 20.27 | 9.45 |
| Image height | 4.07 | 4.63 | 4.63 |
| Total lens length | 45.65 | 42.78 | 60.52 |
| BF | 4.74 | 3.82 | 7.48 |
| d4 | 7.93 | 7.01 | 0.34 |
| d5 | 9.50 | 0.50 | 0.50 |
| d13 | 3.99 | 12.91 | 31.22 |
| d15 | 3.58 | 2.66 | 6.32 |

Zoom lens unit data

| Unit | First surface | Focal length |
|---|---|---|
| 1 | 1 | −12.58 |
| 2 | 6 | 12.97 |
| 3 | 14 | 31.22 |

Stop diameter data

| Surface | Diameter |
|---|---|
| 5 | 6.700 |
| 13 | 5.500 |

Numerical Embodiment 3

Unit mm

Surface data

| Surface number | r | d | nd | νd |
|---|---|---|---|---|
| 1* | −3205.929 | 1.10 | 1.84954 | 40.1 |
| 2* | 5.987 | 1.70 | | |
| 3 | 9.716 | 1.60 | 1.92286 | 18.9 |
| 4 | 20.076 | (Variable) | | |
| 5 SP | ∞ | (Variable) | | |
| 6* | 6.047 | 2.30 | 1.74330 | 49.3 |
| 7* | 146.498 | 0.15 | | |
| 8 | 5.899 | 1.65 | 1.51633 | 64.1 |
| 9 | −34.497 | 0.50 | 1.80518 | 25.4 |
| 10 | 3.904 | 1.50 | | |
| 11 | 11.336 | 1.50 | 1.77250 | 49.6 |
| 12 | −19.834 | 0.29 | | |
| 13 FS | ∞ | (Variable) | | |
| 14 | ∞ | 0.84 | 1.51633 | 64.1 |
| 15 | ∞ | 0.50 | | |
| Image plane | ∞ | | | |

Aspherical surface data

First surface

K = −7.54512e+008  A4 = −3.33905e−004  A6 = 8.22959e−006
A8 = −5.13009e−008  A10 = −2.13056e−010

Second surface

K = −2.57568e+000  A4 = 9.05690e−004  A6 = −1.99981e−005
A8 = 9.37294e−007  A10 = −1.63131e−008

Seventh surface

K = −1.93219e−001  A4 = −2.75397e−004  A6 = 4.99940e−006
A8 = −2.07666e−007  A10 = −1.57616e−008  A12 = 7.43750e−009

Eighth Surface

K = 1.19672e+003  A4 = 1.58244e−007  A6 = −1.07394e−005
A8 = 1.35072e−006  A10 = 9.21810e−008  A12 = 3.27632e−006

Various data
Zoom ratio 2.56

| | Wide angle | Intermediate | Telephoto |
|---|---|---|---|
| Focal length | 5.26 | 9.94 | 13.45 |
| F-number | 1.87 | 3.28 | 3.80 |
| Half angle of field (degree) | 32.67 | 21.30 | 16.07 |
| Image height | 3.37 | 3.88 | 3.88 |
| Total lens length | 31.48 | 25.36 | 25.10 |
| BF | 6.69 | 10.03 | 12.54 |
| d4 | 5.00 | 3.53 | 0.76 |
| d5 | 7.50 | −0.50 | −0.50 |
| d13 | 5.64 | 8.98 | 11.49 |

Zoom lens unit data

| Unit | First surface | Focal length |
|---|---|---|
| 1 | 1 | −12.16 |
| 2 | 6 | 8.68 |

Stop diameter data

| Surface | Diameter |
|---|---|
| 5 | 4.750 |
| 13 | 5.000 |

TABLE 1

| Conditional Expression | | Embodiment 1 | Embodiment 2 | Embodiment 3 |
|---|---|---|---|---|
| (1) | Dsw/D2w | 0.422 | 0.593 | 0.556 |
| (2) | f2/f1 | −1.031 | −1.031 | −0.714 |
| (3) | Dss/fw | 4.051 | 3.279 | 2.929 |
| (4) | Φfw/φbw | 0.946 | 1.218 | 0.950 |
| (5) | φDw/fw | 0.524 | 0.538 | 0.535 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-009114, filed Jan. 22, 2013, which is hereby incorporated by reference herein in its entirety.

What is claimed is:

1. A zoom lens, comprising, in order from an object side to an image side:
   a first lens unit having a negative refractive power;
   a second lens unit having a positive refractive power; and
   an aperture stop disposed between the first lens unit and the second lens unit, the aperture stop moving along a locus different from loci of the first lens unit and the second lens unit during zooming,
   an interval between any lens units adjacent to each other being changed during zooming,
   the second lens unit including at least one positive lens and at least one negative lens, and
   wherein the following conditional expression is satisfied:

$0.40 < Dsw/D2w < 0.60$, where Dsw represents a distance on an optical axis from a lens surface closest to the object side in the zoom lens to the aperture stop at a wide angle end, and D2w represents a distance on the optical axis from the lens surface closest to the object side in the zoom lens to a lens surface closest to the object side in the second lens unit at the wide angle end.

2. A zoom lens according to claim 1, wherein the aperture stop moves along a locus convex toward an image side during zooming from the wide angle end to a telephoto end.

3. A zoom lens according to claim 1, wherein the following conditional expression is satisfied:

$-1.20 < f2/f1 < -0.70$, where f1 represents a focal length of the first lens unit, and f2 represents a focal length of the second lens unit.

4. A zoom lens according to claim 1, further comprising a flare cut stop disposed on an image side of the second lens unit,
   wherein the following conditional expression is satisfied:

$2.50 < Dss/fw < 4.50$, where Dss represents a distance on the optical axis from the aperture stop to the flare cut stop at the wide angle end, and fw represents a focal length of the zoom lens at the wide angle end.

5. A zoom lens according to claim 1, further comprising a flare cut stop disposed on an image side of the second lens unit,
   wherein the following conditional expressions are satisfied:

$0.800 < \phi fw/\phi bw < 1.400$, and $0.500 < \phi Dw/fw < 1.000$, where φfw represents an aperture diameter of the aperture stop at the wide angle end, φbw represents an aperture diameter of the flare cut stop at the wide angle end, φDw represents a diameter of a light beam that is emitted from a point light source positioned at infinity on the optical axis and enters the lens surface closest to the object side at the wide angle end, and fw represents a focal length of the entire system at the wide angle end.

6. A zoom lens according to claim 1, wherein the first lens unit includes, in order from the object side to the image side, a negative lens and a positive lens.

7. A zoom lens according to claim 1, wherein the second lens unit is moved to have a component in a direction perpendicular to the optical axis so as to move an imaging position in the direction perpendicular to the optical axis.

8. A zoom lens according to claim 1, further comprising, on an image side of the second lens unit, a third lens unit having a positive refractive power which moves during zooming.

9. A zoom lens according to claim 1, wherein the zoom lens forms an image on a solid-state image pickup element.

10. An image pickup apparatus comprising:
a zoom lens; and
an image sensor configured to receive an image formed by the zoom lens,
the zoom lens comprising, in order from an object side to an image side:
a first lens unit having a negative refractive power;
a second lens unit having a positive refractive power; and
an aperture stop disposed between the first lens unit and the second lens unit, the aperture stop moving along a locus different from loci of the first lens unit and the second lens unit during zooming,
an interval between any lens units adjacent to each other being changed during zooming,
the second lens unit including at least one positive lens and at least one negative lens, and
wherein the following conditional expression is satisfied:

$0.40 < Dsw/D2w < 0.60$, where Dsw represents a distance on an optical axis from a lens surface closest to the object side in the zoom lens to the aperture stop at a wide angle end, and D2w represents a distance on the optical axis from the lens surface closest to the object side in the zoom lens to a lens surface closest to the object side in the second lens unit at the wide angle end.

* * * * *